Sept. 7, 1965      B. B. BROWN      3,204,908
SUPPORTS
Filed Jan. 17, 1962
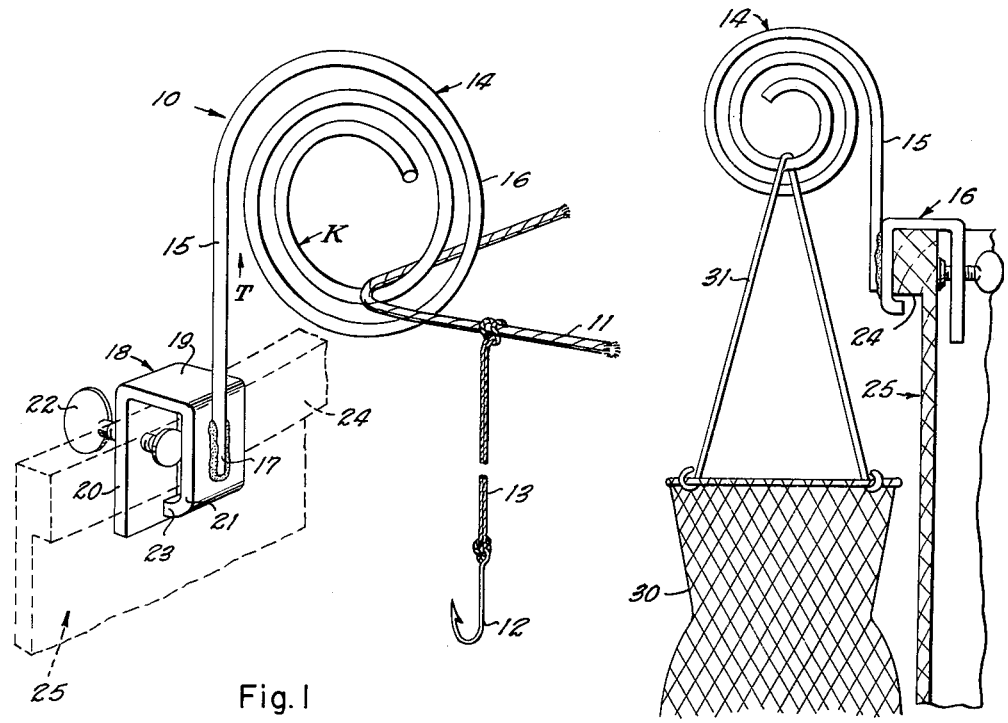
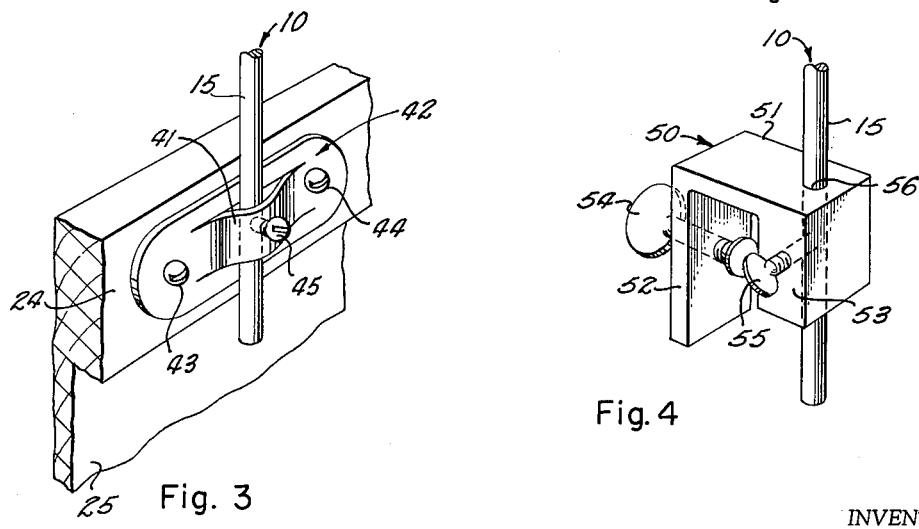
INVENTOR
Bently B. Brown
ATTORNEYS

United States Patent Office 3,204,908
Patented Sept. 7, 1965

3,204,908
SUPPORTS
Bently B. Brown, Box 54, Diana, Tex.
Filed Jan. 17, 1962, Ser. No. 166,801
2 Claims. (Cl. 248—226)

This invention relates to supports and more particularly to a holder for lines and the like.

One object of this invention is to provide a new and improved support.

Another object is to provide a new and improved line holder.

Still another object is to provide a new and improved line holder by which a line may be readily supported without the need of tying the line to the holder.

A further object is to provide a line holder having a line carrying part comprised of a wire or rod arranged in a spiral whereby a line, or the like, may be moved laterally through the throat of the spiral and between the turns thereof to be placed within the spiral of wire and supported thereby.

A still further object is to provide a line holder having means for clamping or securing the line holder to the side of a boat, or the like, and a line carrying part comprised of a wire or rod arranged in a spiral whereby a trot line, or the like, may be moved laterally through the throat of a spiral and between the turns thereof to be placed within the spiral of wire and be supported thereby.

A still further object is to provide a line holder having a line carrying part comprised of a wire or rod having a straight portion and a portion arranged in a spiral whereby a trot line, or the like, may be placed within the turns of the spiral portion and be supported thereby, and means for clamping the line holder to the side of a boat, or the like, which includes an inverted channel shaped member attached to the straight portion of the line carrying part and a set screw through the wall of the channel shaped member for clamping the line holder to the boat, or the like.

A still further object is to provide a line holder having a line-carrying part comprised of a wire or rod having a straight portion and a portion arranged in a spiral whereby a trot line, or the like, may be placed within the turns of the spiral portion to be supported thereby, and means for clamping the line holder to the side of a boat, or the like, which includes an inverted channel shaped member provided with a vertical bore for receiving the straight portion of the wire or rod and set screw means for respectively securing the wire or rod in the vertical bore of the channel member and the line holder to the boat.

A further object is to provide a line holder having a line-carrying part comprised of a wire or rod having a straight portion and a portion arranged in a spiral whereby a trot line, or the like, may be placed within the turns of the spiral portion and be supported thereby, and means for clamping the line holder to the side of a boat, or the like, which includes an inverted channel shaped member attached to the straight portion of the line carrying part and a set screw through the wall of the channel shaped member for clamping the line holder to the boat, or the like, which includes a plate having an outwardly stricken portion whereby the straight portion of the wire or rod may be received between the outwardly stricken portion and the remaining portion of the plate, set screw means for holding the wire in the plate and means for securing the plate to the side of a boat.

Additional objects and advantages of the invention will be readily apparent from the reading of the following description of a device constructed in accordance with the invention, and reference to the accompanying drawings thereof, wherein:

FIGURE 1 is a perspective view showing the line holder of this invention attached to the side of a boat with a trot line supported thereon;

FIGURE 2 is a side view of the line holder of FIGURE 1 when carrying a bait bucket;

FIGURE 3 is a fragmentary view of the line holder of this invention showing a modified form of clamping means for securing the line holder to the side of a boat or other supporting object; and FIGURE 4 is a fragmentary view of the line holder of this invention showing still another modified form of clamping means for securing the line holder to a supporting object.

Referring particularly to the drawings, the holder 10 of this invention is shown in FIGURE 1 supporting a trot line 11 equipped with the usual fish hooks 12 and leader lines 13. The holder comprises a wire or rod 14 having a straight end portion 15 and a spiralled portion 16 which is arranged in a spiral of approximately two and one-half turns with all the spirals and the straight end portion being in the same plane. The straight end portion 15 of the rod is welded at 17 to a clamp or channel-shaped member 18 having a web portion 19 and vertically depending sides 20 and 21. The clamp is provided with a set screw 22 through the wall 20 whereby the holder may be secured to the side of a boat, or the like. The lower end of the wall 21 of the clamp may also be provided with an inwardly extending flange 23 whereby the clamp may more effectively grip an overhanging rail, flange, or the like, such as the flange 24 on the upper end of the side of the boat 25 indicated by broken lines in FIGURE 1.

When the holder is secured by the clamp 18 in the manner indicated in FIGURE 1, it may be used to support such objects as the trot line 11 of FIGURE 1 or a bait bucket 30 as in FIGURE 2.

When it is desired to employ the holder to support a line, the line is moved upwardly into the open throat T of the coil 16 and then moved circularly until it is disposed within the innermost coil K of the spiral where it is most secure. It has been found that the spiral should have at least two or more turns and preferably two and one-half since a coil of only one turn would permit the line or other object, such as the bail 31, of the bait bucket 30 of FIGURE 2, to slip outwardly as the boat rocks in the water and the line or bucket floats on the water. The line or bail may be released from the holder by moving the line or bail spirally between the turns of the holder and out downwardly through the throat T thereof.

It is to be understood, of course, that a variety of means other than the clamp 18 may be employed to secure the holder to the boat. As shown in FIGURE 3, for example, the straight end portion 15 of the line holder may extend through an outwardly stricken portion 41 of a plate 42 which is secured to the side of the boat by any suitable means, as by the bolts or screws 43 and 44. A set screw 45 through the outwardly stricken portion of the plate is provided for clamping the straight end portion of the rod in any selected position longitudinally relative to the plate 42.

Another modified form of clamping means for the holder is illustrated in FIGURE 4. The clamp 50 is in the form of an inverted channel-shaped member having a web portion 51 and vertically depending legs 52 and 53. The clamp is provided with a set screw 54 through the leg 52 whereby the line holder may be secured to the side of a boat, or the like. The vertically depending leg 53 of the clamp is provided with a bore 56 extending vertically therethrough and adapted to receive the straight end portion 15 of the line holder. The leg 53 of the clamp is also provided with a horizontal threaded bore which extends perpendicularly to the vertical bore 56 and opening thereinto and is adapted to receive a set screw 55 therein for holding the straight end portion of the line holder in a selected longitudinal position within the vertical bore of the clamp.

It will thus be seen that a new and improved holder is disclosed herein which includes a carrying part comprised of a wire or rod arranged in a spiral whereby a line, or the like, may be moved laterally through the throat of the spiral and between the turns thereof to be placed within the spiral of wire and be supported thereby.

It will further be seen that a new and improved holder means for clamping or securing the line holder to the side of a boat, or the like, and includes a carrying part comprised of a wire or rod arranged in a spiral whereby a trot line, or the like, may be moved laterally through the throat of the spiral and between the turns thereof to be placed within the spiral of wire and be supported thereby.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A line holder for attachment to a boat comprising: an elongate member having a straight vertical portion and a plurality of spaced spiral continuous coils at the upper end of said straight portion disposed in a single plane and defining a flat spiral having a central horizontal axis perpendicular to and spaced from the longitudinal axis of the straight portion, said spaced coils defining a spiral passage opening outwardly and downwardly adjacent the straight portion and downwardly and inwardly into said spiral whereby a line may be inserted laterally through said passage into the innermost of said coils to be supported thereby; and means for securing said straight portion to a boat in a position wherein said plane of said spiral extends substantially vertically and perpendicularly outwardly of said boat.

2. A line holder for attachment to a boat comprising: an elongate member having a straight vertical portion and approximately two and one-half spaced spiral continuous coils at the upper end of said straight portion disposed in a single plane and defining a flat spiral having a central horizontal axis perpendicular to and spaced from the longitudinal axis of the straight portion, said spaced coils defining a spiral passage opening outwardly and downwardly adjacent the straight portion and downwardly and inwardly into said spiral whereby a line may be inserted laterally through said passage into the innermost of said coils to be supported thereby; and means for securing said straight portion to a boat in a position wherein said plane of said spiral extends substantially vertically and perpendicularly outwardly of said boat.

References Cited by the Examiner

UNITED STATES PATENTS

| 937,480 | 10/09 | Smith | 248—226.1 |
| 1,200,361 | 10/16 | Johnson | 211—106 |
| 1,308,066 | 7/19 | Hayes | 248—211 |
| 1,612,710 | 12/26 | Endsley | 248—51 |
| 1,790,610 | 1/31 | Vindal | 285—64 |
| 2,672,310 | 3/54 | Rush | 248—51 |
| 2,875,489 | 3/59 | Gist | 24—115 |

FOREIGN PATENTS

| 360,523 | 10/22 | Germany. |
| 13,710 | 9/88 | Great Britain. |

CLAUDE A. LE ROY, *Primary Examiner.*